United States Patent [19]

Shimizu

[11] Patent Number: 4,544,240

[45] Date of Patent: Oct. 1, 1985

[54] SOFT FOCUSING LENS ASSEMBLY

[75] Inventor: Seiichi Shimizu, Kanagawa, Japan

[73] Assignee: Canon Kabushiki Kaisha, Tokyo, Japan

[21] Appl. No.: 351,893

[22] Filed: Feb. 24, 1982

[30] Foreign Application Priority Data

Mar. 4, 1981 [JP] Japan ............................... 56-30844
Sep. 10, 1981 [JP] Japan ............................... 56-142640

[51] Int. Cl.⁴ .............................................. G02B 13/20
[52] U.S. Cl. ...................................... 350/429; 350/431
[58] Field of Search ......................... 350/429, 431, 255

[56] References Cited

U.S. PATENT DOCUMENTS 3,862,797  1/1975  Uesugi .................................. 350/255
4,124,276  11/1978  Okano et al. ........................ 350/431
4,154,511  5/1979  Maekawa ............................. 350/431

*Primary Examiner*—John K. Corbin
*Assistant Examiner*—Rebecca D. Gass
*Attorney, Agent, or Firm*—Toren, McGeady, Stanger, Goldberg & Kiel

[57] ABSTRACT

A lens assembly which is capable of being set either to a normally focused position or to a position where the lens effects a soft focus mode, with both types of operation being performed by actuation of a single actuator member.

3 Claims, 12 Drawing Figures

SOFT FOCUSING LENS ASSEMBLY

The present invention relates generally to lens assemblies and more particularly to mechanical mounting systems for such lens assemblies. The invention is particularly directed toward a mechanical mounting system which is adapted to enable achievement of a so-called "soft" effect in the lens assembly by displacing the focusing lens members partially axially from the in-focus position so that the paraxial region of the image format will be sharply in focus and the non-paraxial region thereof will be imparted nonlinearly increased aberration to produce a diffusion effect so as to "soften" the photographic image.

In the camera art, while it is generally desirable to provide lenses which are capable of being focused to produce an image format having the sharpest possible definition throughout the entire area thereof, lenses that are corrected for aberrations with extreme precision are not necessarily always considered the most desirable from the point of view of achieving the best photographic results. Furthermore, even where perfect avoidance or removal of lens aberrations is considered desirable, such an ideal lens would be very difficult to produce.

Thus, photographic lenses having some residual aberrations are generally acceptable and balancing of the various aberrations in different ways provides different features or characteristics in the lens enabling the lens to be adapted to the individual taste of respective users and thereby to be categorized in accordance with a user's preference.

Mechanical mountings for lens assemblies are known in the prior art which are capable of controlling the axial movement of the focusing members in accordance with a design scheme with sufficient accuracy so as to ensure good stability of correction of various aberrations in accordance with optics theory and to preserve such good stability throughout the entire focusing range of the lens assembly. Aberrations which may be introduced into the image format at any focusing station are reduced as much as possible thereby providing a desirable lens arrangement.

Additionally, it is also known to provide a lens mounting mechanism which is capable of producing a soft focusing effect and such a mechanism is known in the prior art from Japanese patent publication Sho No. 52-76921 dated June 28, 1977.

In accordance with prior art arrangements, lens assemblies may be provided with two or three lens groups which make up the lens system and a focusing ring is adapted to move the lens groups of the lens system in order to effect normal focusing thereof. Usually, in such prior art arrangements, a second member such as a control ring is necessary in order to enable soft focusing operation of the lens by effecting change in the axial spacing between the various lens groups of the lens system.

Thus, in such prior art arrangements structured in accordance with conventional techniques, the lens assembly is provided with both a focusing ring for ordinary focusing purposes and with an aberration control ring, with the two rings being constructed as separate actuators operable independently from each other and arranged as two separate operating members.

The present invention is directed toward providing a lens assembly which is capable of being operated both in a normal focusing mode and in a soft focusing mode and which is simpler in construction and easier to operate than prior art devices.

SUMMARY OF THE INVENTION

Briefly, the present invention may be defined as a lens assembly which is adapted for both normal focusing operation and soft focusing operation, the assembly comprising a lens system including at least a first and a second lens group mounted for axial movement in the lens assembly, an actuator member capable of effecting both normal focusing operation of said lens system and soft focusing operation thereof and means responsive to the focusing operation of said actuator member for moving the first and second lens groups in response to the actuator member to effect both the normal and the soft focusing operation.

With the present invention, since the lens assembly is capable of being operated with a single actuating member, because of the omission of the necessity for a separate member for effecting the soft focusing control, handling convenience of the lens assembly is enhanced and the complexity of lens management which would otherwise result from the use of two actuator members can be avoided.

Thus, the invention provides a lens system having a focusing lens operable by the single actuator member wherein the focusing lens is formed as comprising a plurality of lens groups, for example two lens groups, with the two lens groups being respectively mounted on separate moving means, operation of which is controlled in such a manner that when focusing is performed, for example by rotation of the actuator member around the optical axis, the two lens groups are actually moved in fixed relationship with each other and, as the actuator member is moved axially, the separation between the respective lens groups is adjusted to obtain the softening effect.

Since the focusing function and the softening function are carried out by a single common actuator, there results a good possibility that after the in-focus condition has been established by rotation of the actuator, when it is desired to perform the softening effect by sliding the actuator axially, since some unconscious rotative movement may be imparted into the actuator, the rotatable lens group may be shifted from the in-focus position. Therefore, a further aspect of the invention involves provision of a mounting mechanism for the lens assembly whereby the occurrence of accidental shifting of the rotatable lens group is avoided.

In a more specific aspect of the invention, means are provided in the lens assembly to operate as a safety mechanism, rendering it possible to prevent accidental movement of the actuator member with the actuator member being maintained locked in the focused position.

One particular feature of the invention which is considered to be characteristic thereof is that a single actuator member will suffice to set the lens assembly selectively in a plurality of focusing modes and to control the operation of the assembly in the selected mode whereby when in a first focusing mode an image format will be sharply in focus throughout the field thereof and when in a second focusing mode the amount of aberration which may be introduced into the image format may be selectively controlled in order to effect the soft focusing mode.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

In order to provide a better understanding of the present invention and of the general field of application thereof, there will be first described by reference to FIGS. 1, 2, and 3, structures and operation of lens mounting mechanisms of the type to which the present invention relates.

Figure 1:
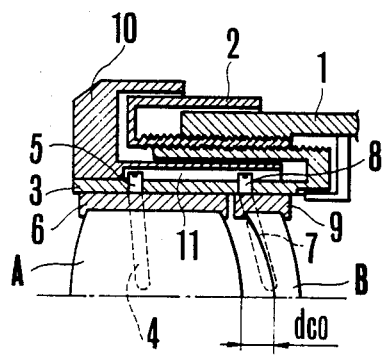
FIGS. 1, 2, and 3 are schematic cross-sectional views of soft focusing lens mountings known in the prior art.

Referring specifically first to FIG. 1, there is shown a lens assembly which comprises a fixed barrel 1 having a focusing ring 2 operatively mounted thereon, with rotative motion of the ring 2 being transmitted through a double-helicoid and linear-key mechanism in order to effect axial movement of a cam sleeve 3 relative to the fixed barrel 1. The assembly of FIG. 1 is provided with a lens system which includes a lens group A which is held by a first inner sleeve 6 having a radial pin 5 extending outwardly therefrom into a cam groove 4 in the cam sleeve 3. The lens system also includes a lens group B which is held by a second inner sleeve 9 having a pin 8 radially outwardly extending into a cam groove 7 in the cam sleeve.

Upon rotation of the focusing ring 2, the two lens groups A and B will be axially moved as a unit. In order to change the spherical aberration of the lens system, a control ring 10 is rotated whereby the first inner sleeve 6 and the second inner sleeve 9 are rotated through a mechanism including the pins 5 and 8 and a groove 11 parallel to the optical axis. Thus, in accordance with the arrangement of the cam grooves 4 and 7, the lens groups A and B are axially moved relative to the cam sleeve 3. However, while the axial movement of both the lens groups A and B is controlled, the spacing or separation $d_{BO}$ therebetween changes. It is noted that in this connection if the number of lens groups which are movable relative to the cam sleeve increases, the number of pairs of cam grooves and inner sleeves may be increased and that other lens groups whose movement relative to the cam sleeve is unnecessary may be held directly by the cam sleeve.

Figure 2:
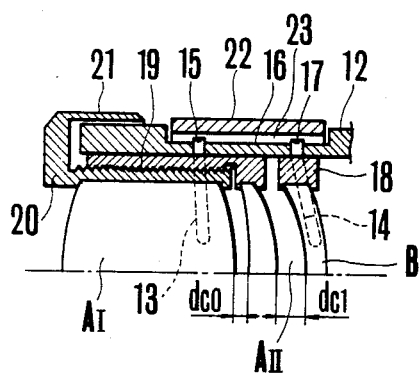

Another arrangement is shown in FIG. 2 wherein a lens assembly is provided with a fixed barrel 12 having cam grooves 13 and 14. The lens system of the example of FIG. 2 includes a lens group $A_{II}$ which is held by a first inner sleeve 16 having a pin 15 radially outwardly extending into the cam groove 13. The lens system also includes a lens group B which is held by a second inner sleeve 18 having a pin 17 radially outwardly extending into the cam groove 14. Another lens group $A_I$ of the lens system is held by a third inner sleeve 20 fitted in the first inner sleeve 16 through a helicoid 19 and rotatable by a focusing ring 21. Upon rotation of the focusing ring 21, only the lens group $A_I$ is axially moved with change in the spacing or separation $d_{A7}$. In order to change the spherical aberration, the operator must rotate a control ring 22 whereby rotative motion of the axial groove 23 is transmitted to the pins 15 and 17 in order to axially move the first inner sleeve and the second inner sleeve with change in the variable spacing or separation $d_{BO}$. At this time, the lens group $A_I$ and the lens group $A_{II}$ are moved in unison with the spacing $d_{A7}$ being maintained constant.

Figure 3:
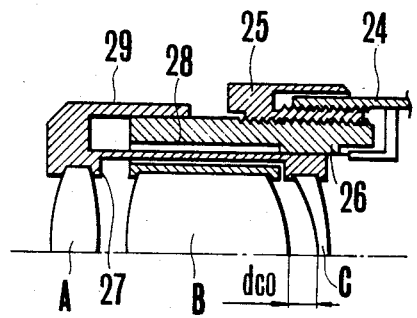

In FIG. 3, a lens assembly is shown wherein upon rotation of a focusing ring 25 relative to a fixed barrel 24, a double-helicoid and linear-key mechanism assist in axially moving a first inner sleeve containing a lens group B of the lens system and a second inner sleeve containing lens groups A and C moved in unison. Since the second inner sleeve 27 holds the lens groups A and C for movement in unison through means passing through an axial hole 28 in the first inner sleeve, it is axially slidable relative to the first inner sleeve. Therefore, upon axial movement of the aberration control ring 29, the variable spacing or separation $d_{CO}$ is caused to change whereby the amount of spherical aberration which may be introduced into the image format can be controlled.

Again, it should be noted that the conventional lens assemblies described above are each provided with both a focusing ring for ordinary focusing purposes and with an aberration control ring and that two rings structured as separate actuators operable independently of each other are provided in each of these examples described above.

A construction in accordance with the present invention is shown in FIGS. 4–7 wherein there is depicted a first embodiment of the invention. The assembly depicted in FIG. 4 includes a tubular body 100 provided with mount means 100a in order to enable the entire lens assembly to be affixed to a camera (not shown) by engagement with coupling means of the camera. A double helicoid sleeve 102 has an outer helicoid 102a threadedly fitted in an inner helicoid 101b of the tubular body 100 and an inner helicoid 102b threadedly fitted on an outer helicoid of a first slidable sleeve 103. A scale sleeve 102A is fixed to the double helicoid sleeve 102 and is fitted on the outer diameter of the tubular body 100. A distance scale and a scale showing the amount of variation of the softening focus are provided on the outer surface of the sleeve 102A.

Figure 5:
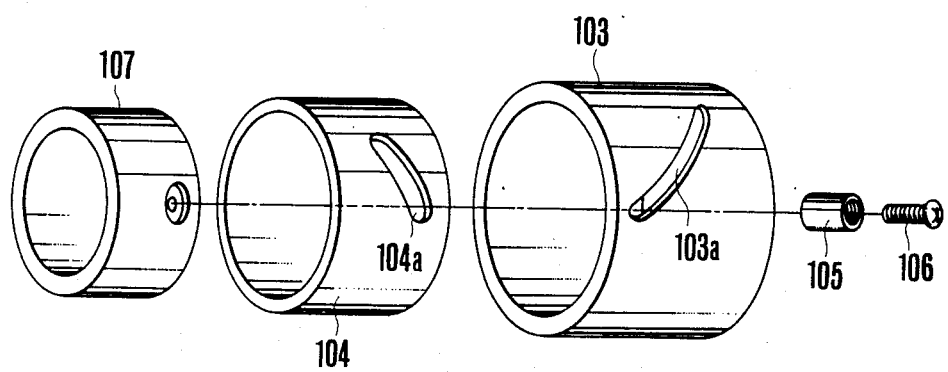
FIGS. 5, 6, and 7 are each perspective views of parts of the lens assembly of the present invention shown in FIG. 4.

A second slidable sleeve 104 is fitted in the first slidable sleeve 103. The first and second slidable sleeves have lead grooves 103a and 104a of a different lead amount respectively formed therein as illustrated in FIG. 5. Fitted at the point of intersection is an eccentric roller 105 rotatable about a pin 106 radially outwardly extending from a first lens cell 107.

Figure 6:
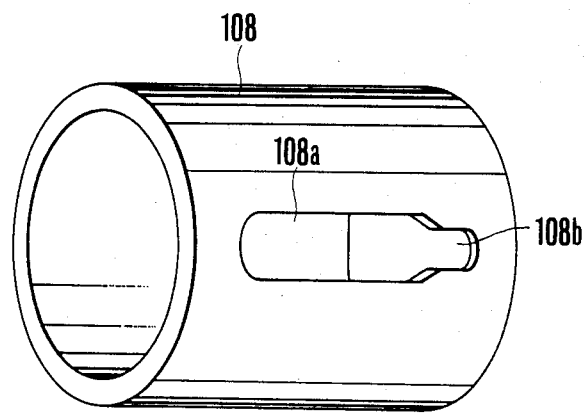

The assembly is provided with an actuator ring 108 which is arranged upon rotation thereof to adjust the object distance of the lens system provided in the lens assembly and which also operates upon axial movement thereof to adjust the amount of aberration which is introduced into the image format. Formed on the actuator ring 108, as best seen in FIG. 6, is an axial groove including contiguous groove portions 108a and 108b, each of a different width, with the narrower groove 108b accommodating in snug engagement a collar 110 which is journaled on a pin 109 which extends radially outwardly from the double helicoid sleeve 102. The assembly is also provided with a knurled ring 111.

Figure 7:
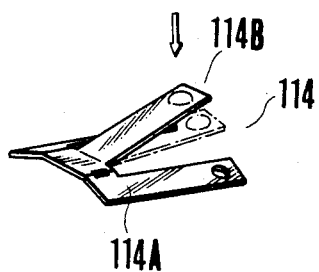

A drive connection ring 112 is fixed to the second slidable sleeve 104 by a screw fastener 113 and it is operatively connected to the first slidable sleeve 103 through a releasable connector 114 having a resilient element such as a spring member. The releasable connector 114 is illustrated in FIG. 7 and is provided with a base portion 114A which is fixed to the outer surface of the first slidable sleeve 103. A tongue 114B extends from the base portion 114A and it is formed with a bowed configuration so that its free end will be urged into engagement with the rear edge 112a of the drive connection ring 112. A helicoid sleeve 115 is fixedly fitted in the inner diameter of the actuator ring 108 and threadedly engages a helicoid portion 112b of the connection ring 112. The helicoid sleeve 115 may otherwise be formed integrally or joined with the actuator ring 108. Provided between the actuator ring 108 and the connection ring 112 are stopper members 115a and 112c for limiting the range of rotation of the actuator ring 108.

Between the first and second slidable sleeves 103, 104 there is provided means for restraining the second slidable sleeve 104 from rotative movement in order to permit axial movement of the actuator ring 108.

This means is in the form of an axially elongated slot 103a formed in the first slidable sleeve 103 in which there is engaged a key member 116 fixedly mounted on the second slidable sleeve 104.

The first slidable sleeve 103 is provided with an axially elongated groove 103b formed in the inner surface thereof within which there is engaged a linear key member 118 fixed to the tubular body 100 by a screw fastener 117.

A diaphragm device D is supported in the second slidable sleeve 104 and is cooperative with a signal transmission member 120 and a drive member 121.

Figure 4:
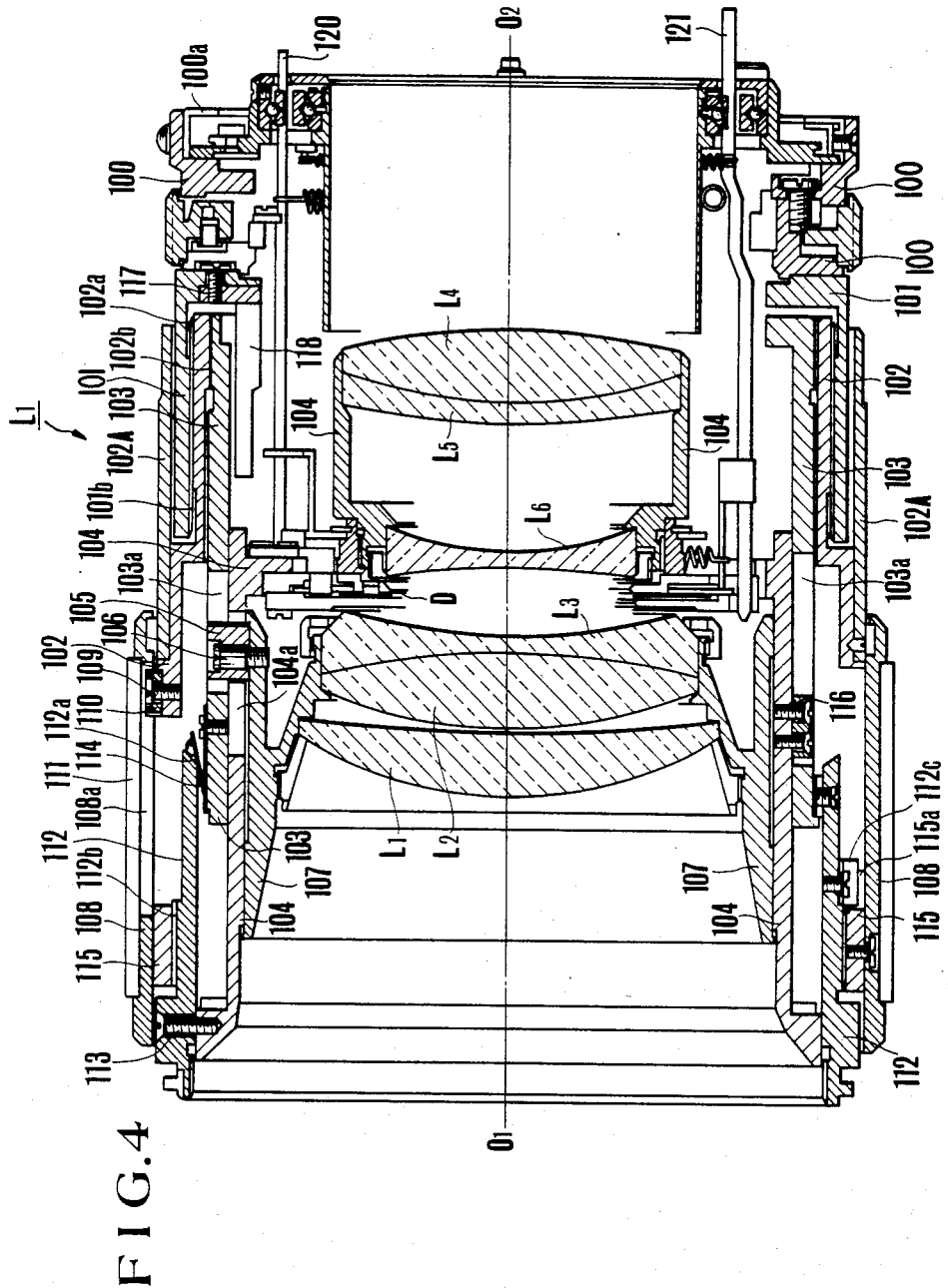
FIG. 4 is an axial sectional view of a lens assembly in accordance with the present invention.

The lens system of the assembly depicted in FIG. 4 includes six lens elements designated $L_1$ to $L_6$ with a first lens group being formed by the lens elements $L_1$, $L_2$, and $L_3$ held in the first lens cell 107 and with a second lens group being formed by the lens elements $L_4$, $L_5$, and $L_6$ which are held in the second slidable sleeve 104.

Operation of the mechanical mounting system of the assembly shown in FIG. 4 may be effected by rotating the actuator ring 108. When the actuator ring 108 is turned, the double helicoid sleeve 102 is also turned through the mechanism of the groove 108a, roller 110 and pin 109. Such rotative movement of the double helicoid sleeve 102 causes axial movement of the first slidable sleeve 103, since it is constrained from rotation by the key member 118. This in turn causes engaging relationship of the roller 105 and pin 106 with the lead grooves of the first and second slidable sleeve 103 and 104 thereby to move the first lens cell or holder 107 axially along the lens assembly. Also, since the first slidable sleeve 103 and the drive connection ring 112 are rendered cooperative by the releasable connector member 114, the motion of the first slidable sleeve 103 is transmitted through the releasable connector 114 and the drive connection 112 in order to axially move the second slidable sleeve 104. Thus, rotative operation of the actuator ring 108 will effect axial movement of the first lens cell 107 and of the second slidable sleeve 104 in fixedly spaced relationship with each other with the lens elements $L_1$-$L_6$ being thereby focused upon an object located at a distance therefrom depending upon the degree of movement thereof.

Thus, when the photographer wishes to introduce into the image format a desired amount of aberration based upon the lens optics with the image being maintained in focus, thereby to obtain a softening effect on the image, it is necessary only to axially move the same actuator ring 108. By effecting this mode of operation, the actuator ring 108, the helicoid barrel 115, the connecting ring 112 and the second slidable sleeve 104 will be axially moved as a unit thereby, in turn, causing the engaging relationship of the lead slots 103a and 104a to axially move the first lens cell or holder 107. Since axial movement of the actuator ring 108 for creating the softening effect on the image is accompanied by the same amount of axial movement of the second lens group $L_4$-$L_6$, and since the first lens group $L_1$-$L_3$ is axially moved by an amount equal to the difference between the leads of the slots in the first and second slidable sleeves 103, 104, the first and second lens groups will be axially moved in a differential relationship relative to each other and relative to the focal plane. Thus, a diffusing effect due to the amount of aberration depending on the amount of axial movement of the actuator ring 108 will be produced in order to soften the image.

During operation of the embodiment described above, taking into consideration the fact that focusing operation of the actuator ring 108 may be transposed into the softening operation, the operator may tend to unintentionally turn the actuator ring 108 despite the fact that exact axial movement is required for the softening operation. In view of this, provision is made for preventing an established in-focus position of the first and second lens groups from being undone. The means to accomplish this are provided in the form of a portion 108a of the axially elongated slot in the ring 108, which portion 108a is made slightly wider than the outer diameter of the roller 110 so that even when a greater or lesser rotative component is transmitted during the softening operation of the actuator ring 108, the double helicoid sleeve 102 will be left unresponsive to the rotative component of motion.

Figure 8:
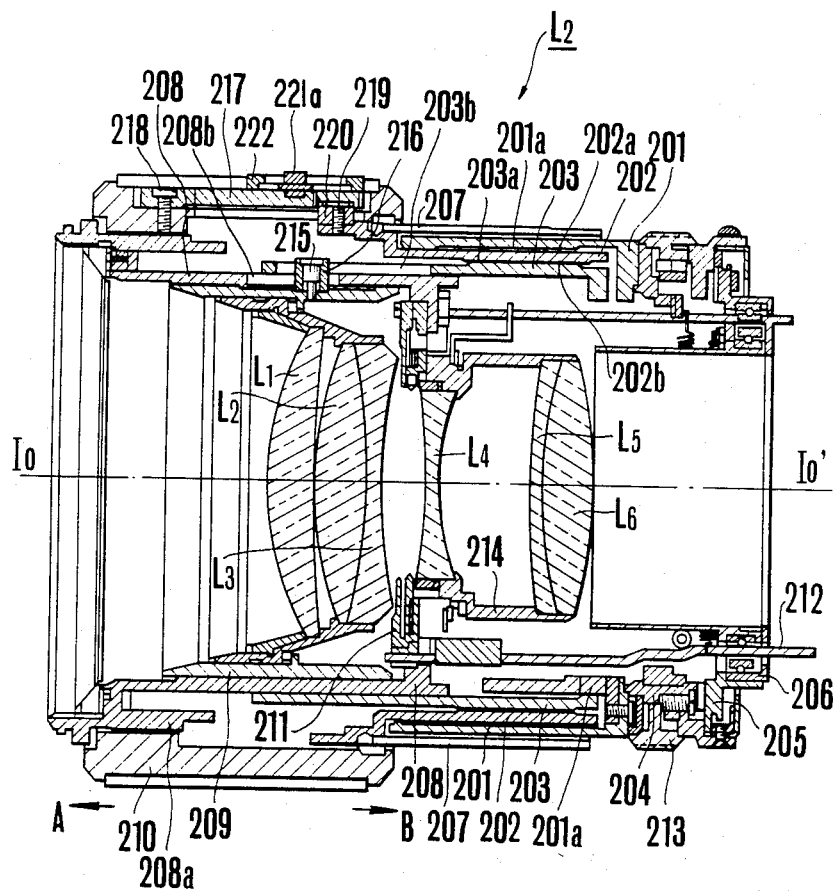
FIG. 8 is a longitudinal sectional view of a lens assembly in accordance with the second embodiment of the invention.
Figure 9:
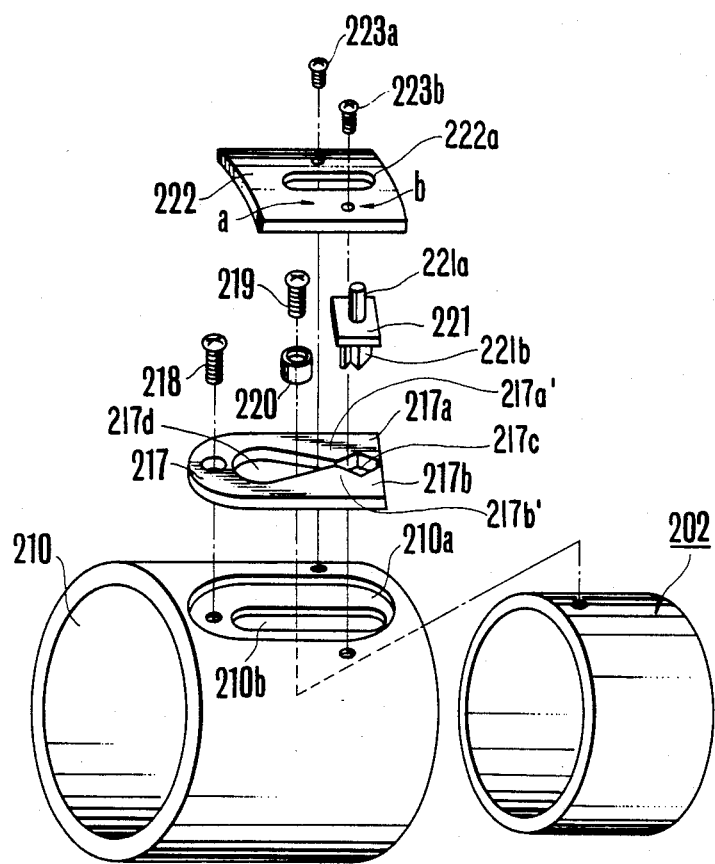
FIG. 9 is an exploded perspective view showing parts of the assembly of FIG. 8.

A second embodiment of the present invention is illustrated in FIGS. 8–10 particularly with regard to the provision of a lock mechanism for the actuator member, which is one of the principal features of the invention.

In FIGS. 8–10, there is shown an assembly comprising a fixed barrel 201 threadedly engaging a double helicoid barrel 202 at screw threaded portions 201a and 202a, with the double helicoid barrel 202 threadedly engaging an axially movable helicoid barrel 203 at screw threaded portions 202b and 203a.

Mount holder members 204 and 205 fixed to the fixed barrel 201 and holding a mount means 206 permit the interchangeable lens assembly depicted in FIG. 8 to be attached to a camera body (not shown). The mount means are of a known construction and may be formed as a bayonet or screw threaded mounting mechanism. A scale sleeve 207 is fixed to the double helicoid barrel 202 by means of a screw fastener.

An axially movable sleeve 208 is fitted in the inner diameter of the axially movable helicoid barrel 203 and includes a key (not shown) for effecting axial movement in cooperation with the axially movable helicoid 203. Fitted in the inner diameter of the sleeve 208 is a first lens holder member 209 containing a first lens group including elements $L_1$–$L_3$.

A focusing ring 210 is arranged in threaded engagement with the movable sleeve 208 at a screw threaded portion 208a formed in the outer periphery of the sleeve 208. The axially movable sleeve 208 contains a diaphragm device 211 of known construction which cooperates with a signal member 212 and with a presetting ring 213 to adjust the aperture size automatically or manually, in a manner known to those skilled in the art.

Also fixed to the axially movable sleeve 208 is a second lens holder member 214 containing a second lens group including the elements $L_4$–$L_6$.

The first lens holder member 209 has a radial pin 215 mounted thereon upon which there is rotatably fitted a first roller 216, the roller 216 engaging snugly in a cam slot 203b of the axially movable helicoid barrel 203 and a cam slot 208b of the axially movable sleeve 208 at the point of intersection thereof, as illustrated in FIGS. 8 and 9.

Figure 10A:
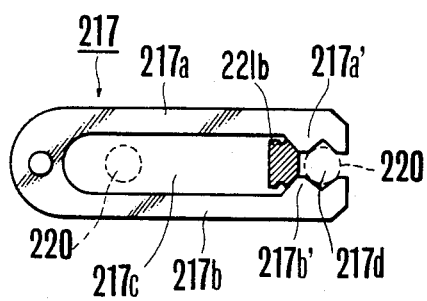
FIGS. 10(a) and 10(b) are each plan views of a lock mechanism of the second embodiment of the invention depicted in FIG. 8.
Figure 10B:
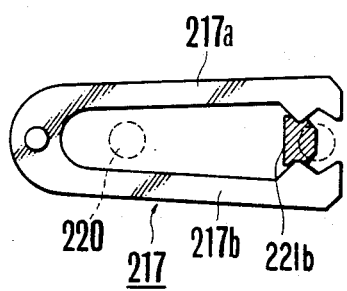

A U-shaped spring member 217 illustrated in FIGS. 10(a) and 10(b) is arranged in a recessed portion 210a formed in the outer periphery of the focusing ring 210 and is fixedly secured thereto at the round end thereof by a screw fastener 218. A pair of arms 217a and 217b of the spring member 217 are urged in a direction to close the opening end thereof with the inside edges of the arms 217a and 217b being provided with projected portions or jaws 217a' and 217b' which confront each other.

Formed on the spring member 217 are a pair of apertured portions 217c and 217d arranged between the arms 217a and 217b which communicate or are arranged contiguously with each other across projected portions 217a' and 217b'.

A screw 219 and a second roller 220 are also provided, with the roller 220 being journaled on the screw 219 which is mounted radially on the end portion of the double helicoid barrel 202. The roller 220 extends through an axially elongated slot 210b formed through the wall of the recessed portion 210a of the focusing ring 210 and either of the apertured portions 217c and 217d of the spring member 217 which is snugly fitted in the recessed portion 210a. A lock member 221 comprising a control knob portion 221a and a leg portion 221b is slidably movably supported by a cover 222 for the recessed portion 210a. The knob portion 221a extends through and projects outwardly from an elongated slot 222a of the cover 222 and it is therefore accessible from the outside of the lens assembly. The leg portion of the lock member 221 lies in the apertured portion 217c of the spring member 217 and when it is pushed against the projected portions 217a' and 217b' by operation of the control knob 222a it operates to widen or separate the clamping arms 217a and 217b.

In the operation of the mechanical mounting system of the lens assembly of the embodiment of FIGS. 8–10, when the interchangeable lens assembly is to be used without producing the softening effect, but instead in the ordinary focusing mode of operation without introduction of aberration into the image format, the operator will push the control knob 221a of the lock member 221 in a direction whereby the leg portion of the lock member will be displaced into the larger opening portion 217c of the spring member 217. The arms 217a and 217b will thereby be rendered cooperative in order to close the projected portion. With the spring member 217 in this position, when the focusing ring 210 is moved forwardly in the direction A, the second roller 220 will be clamped within the small opening 217d of the spring member 217 (see FIG. 10(a)). Also, the axially movable sleeve 208 is also moved in the direction A and therefore the second lens group including the lens elements $L_4$–$L_6$ is moved in the direction A together therewith. Thus, setting of the focusing ring 210 in the forwardly advanced or ordinary focusing position will establish the predetermined location of the first lens group $L_1$–$L_3$ and of the second lens group $L_4$–$L_6$ with the desired spacing therebetween being established in order that focusing for production of an image format without spherical aberration can be developed by the composite optical system $L_1$–$L_6$.

When it is desired to switch the lens system to operation in the soft focusing mode in order to produce a softening effect on the image, the control knob of the lock member 221 is moved rearwardly in the direction B whereby the leg portion thereof is moved to enter between the projected portions and the two arms 217a and 217b of the spring member are urged apart to permit the second roller 220 to move from the opening 217c into the opening 217d across the projected portions. Then, when the focusing ring is axially moved rearwardly in the direction B, the axially movable sleeve 208 is driven to move in the direction B while effecting movement of the second lens group $L_4$–$L_6$ in the same direction thereby increasing the separation or axial spacing between the first lens group $L_1$–$L_3$ and the second lens group $L_4$–$L_6$. As a result, the image format will be defocused due to the increased spherical aberration produced in order thereby to produce a softening effect upon the image.

Focusing operation is controlled by turning the focusing ring 210 about the optical axis as the first lens holder 209 is axially moved forwardly by displacement of the point of intersection of the cam slots 203b and 208b since the axially movable sleeve 208 is guided for axial movement by a linear key (not shown) which is cooperative with the axially movable helicoid barrel 203.

As has been described in the foregoing, in accordance with the present invention, transition from the ordinary focusing mode to the softening focusing mode can be effected by changing the direction of movement of the focusing actuator member 210 into an axial direction of movement and the amount of spherical aberration which is introduced into the image format may be selectively controlled by the same focusing actuator member. Furthermore, the use of a safety mechanism comprising the lock member 221, a spring member 217, and the second roller 220 will impart advantageous features in that unitentional shift of the focusing actuator member 210 away from the ordinary focusing position into the focusing with a softening mode of operation or vice versa can be avoided.

Figure 11:
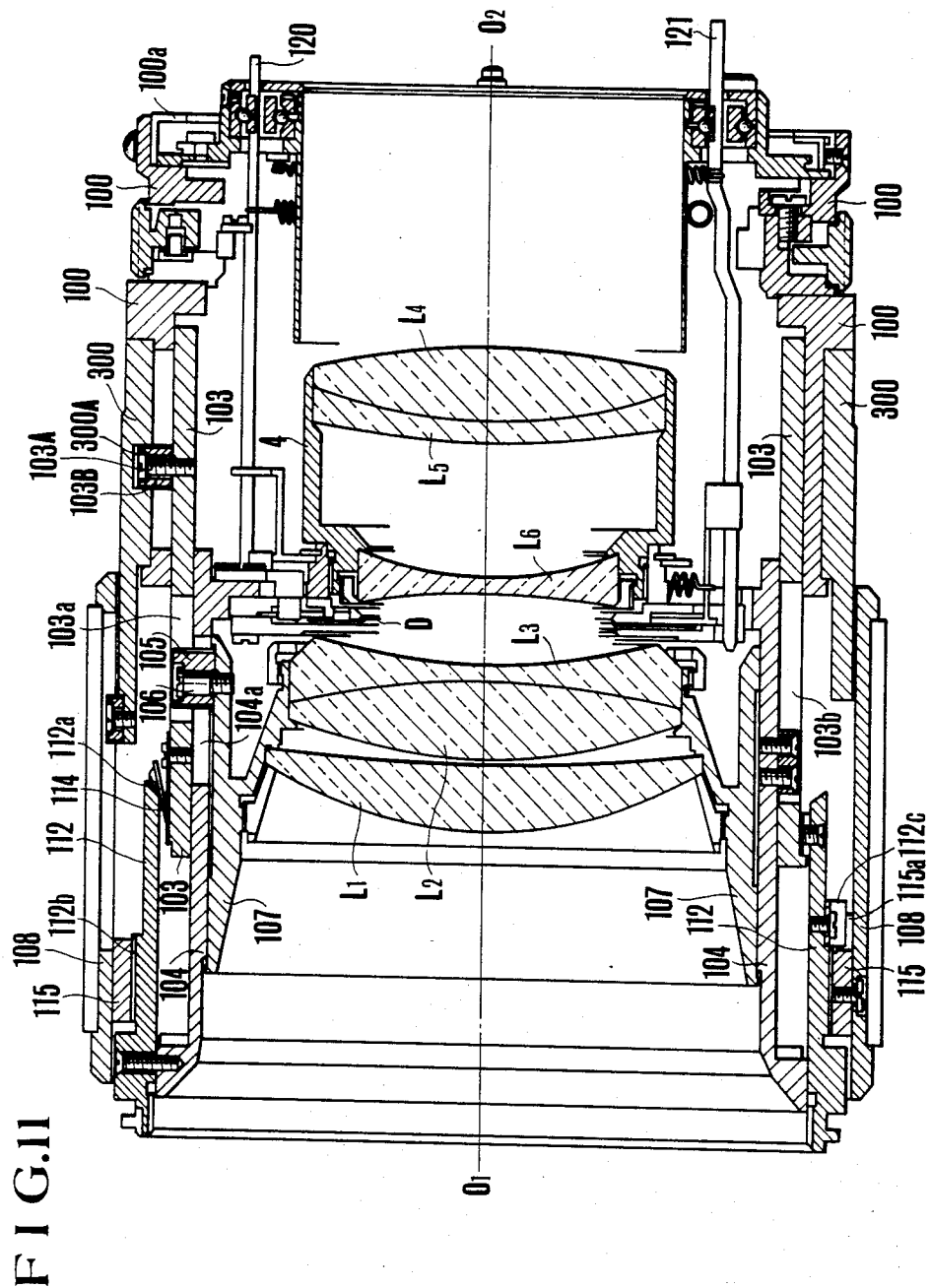
FIG. 11 is a longitudinal sectional view of a further modification of the embodiment of FIG. 4.

FIG. 11 illustrates the third embodiment of the invention which is an example of a modification of the embodiment depicted in FIG. 4.

Since, in the embodiment of FIG. 4, the focusing control mechanism for the first lens group $L_1$-$L_3$ and for the second lens group $L_4$-$L_6$ has many constituent parts, the structure of the mounting mechanism is somewhat complicated and the diameter of the outer barrel is also increased.

The embodiment of FIG. 11 involves improvement with regard to this aspect of the assembly in that a cam sleeve 300 which is rotated by turning the actuator member 108 about the optical axis is fitted between the tubular body 100 and the first axially movable sleeve 103 with a cam slot 300A being machined through the wall thereof in which there is engaged a roller 103B journaled on a radial pin 103A extending from the first sleeve 103.

With this structural arrangement, when the actuator member 108 is rotated, the first axially movable sleeve 103 is moved axially linearly through the cam sleeve 300. The other parts of the embodiment of FIG. 11 are similar in construction to those shown in FIG. 4 and identical reference characters have been employed to denote these parts.

The example of the embodiment of FIG. 11 involves advantages in that the mechanical mounting may be constructed in a simpler form.

It will be appreciated that each of the first, second, and third embodiments disclosed above will provide a mechanical mounting for a lens system having a single actuator member which makes it possible to operate the lens system selectively either in an ordinary focusing mode or in a soft focusing mode with the advantage that manageability of the lens assembly is improved with broadened capabilities.

While specific embodiments of the invention have been shown and described in detail to illustrate the application of the inventive principles, it will be understood that the invention may be embodied otherwise without departing from such principles.

What is claimed is:

1. A lens assembly comprising:
   (a) first and second lens holder members containing first and second lenses for focusing respectively and defining an optical axis;
   (b) an actuator member capable of a rotative operation about said optical axis of said lenses and a linear operation along said optical axis;
   (c) a linear moving member responsive to rotation of said actuator member for linear movement;
   (d) lens moving means operative upon engagement with said linear moving member to adjust the distance between said first and said second lens holder members in accordance with the movement of said moving member thereby to perform a focusing operation;
   (e) means for moving said first lens holder member to change the aberration of said lens assembly, said means connecting said actuator member and said first lens holder member with each other and being responsive to linear movement of said actuator member for moving said first lens holder member so that said lens assembly is set in a position where the aberration thereof is changed.

2. A lens assembly according to claim 1 further comprising means for locking said actuator member, said locking means locking the changing over to a position for normal focusing owing to the linear operation of said actuator member and to a position operating to change the aberration of said lens assembly.

3. A lens assembly according to claim 2 wherein said locking means comprises:
   (a) a member for converting the rotative movement of said actuator member to an axial movement of said linear moving member;
   (b) an engaging member fixed to said converting member and extending into a straight groove formed in said actuator member;
   (c) a member for holding said engaging member in a normal focusing position and in a changed aberration position within said straight groove; and
   (d) a member for selecting the motion hinderance and release of said engaging member in said straight groove.

* * * * *